US006047758A

United States Patent [19]

Kuramoto et al.

[11] Patent Number: 6,047,758

[45] **Date of Patent: *Apr. 11, 2000**

[54] METHOD FOR REPEATEDLY USING IMAGE HOLDING MEMBER

[75] Inventors: Shinichi Kuramoto, Numazu; Youichi Asaba; Kiyoshi Tanikawa, both of Yokohama; Yoshiaki Miyashita; Satoshi Shinguryo, both of Kawasaki; Sadao Takahashi; Yoshiyuki Kimura, both of Tokyo; Kazuhiro Ando, Satte; Tadashi Saitoh, Yokohama, all of Japan

[73] Assignee: Ricoh Company, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/989,076

[22] Filed: Dec. 11, 1997

Related U.S. Application Data

[63] Continuation of application No. 08/822,702, Mar. 21, 1997, Pat. No. 5,753,400, which is a continuation of application No. 08/310,391, Sep. 22, 1994, abandoned.

[30] Foreign Application Priority Data

| | | | |
|---|---|---|---|
| Sep. 22, 1993 | [JP] | Japan | 5-259275 |
| Aug. 26, 1994 | [JP] | Japan | 6-225671 |

[51] Int. Cl.[7] .......................... B44C 31/00; B32B 31/00; B32B 5/02; B41F 35/00

[52] U.S. Cl. .......................... 156/540; 156/359; 156/584; 118/60; 118/70; 101/423; 101/424; 15/3.53

[58] Field of Search .................................... 156/230, 247, 156/281, 389, 390, 584, 256.51, 256.52, 231, 94, 344, 359, 378, 478; 118/60, 70, 106; 101/423, 424; 15/1.51, 3.53, 97.1, 102, 103.5, 540

[56] References Cited

U.S. PATENT DOCUMENTS

| | | | |
|---|---|---|---|
| 4,913,991 | 4/1990 | Chiba et al. | 430/45 |
| 5,474,617 | 12/1995 | Saito et al. . | |
| 5,534,063 | 7/1996 | Maruyama et al. . | |
| 5,540,815 | 7/1996 | Igarashi et al. . | |
| 5,547,793 | 8/1996 | Kuramoto et al. . | |
| 5,605,777 | 2/1997 | Ando et al. . | |
| 5,607,534 | 3/1997 | Kawanishi et al. . | |
| 5,642,550 | 7/1997 | Maruyama et al. . | |

*Primary Examiner*—Richard Crispino
*Assistant Examiner*—J. A. Lorengo
*Attorney, Agent, or Firm*—Oblon, Spivak, McClelland, Maier & Neustadt, P.C.

[57] ABSTRACT

In a method for repeatedly using an image holding member such as a sheet of paper, toner for an electronic photograph is constructed such that a maximum value of viscoelasticity of the toner shown by tan δ is equal to or smaller than 3 in the range of a heating temperature when the toner is heated and fixed to the image holding member. Such toner has sufficient elastic or cohesive force. Accordingly, when the toner is heated and fixed to the paper sheet, no excessive adhesive force is caused to such an extent that paper fibers of the paper sheet eat into the toner attached to the paper sheet. Accordingly, after an aqueous solution including a surfactant is supplied to the paper sheet by a liquid supplying unit, the toner is softened by heat from heating rollers so that the toner is attached to a surface of an offset belt. When the toner attached to the surface of the offset belt is separated from the paper sheet, the toner can be completely removed from the paper sheet without damaging paper fibers on a surface of the paper sheet.

8 Claims, 2 Drawing Sheets

METHOD FOR REPEATEDLY USING IMAGE HOLDING MEMBER

This application is a Continuation of application Ser. No. 08/822,702, filed on Mar. 31, 1997, now U.S. Pat. No. 5,453,400, which is a Continuation of application Ser. No. 08/310,391, filed on Sep. 22, 1994, now abandoned.

BACKGROUND OF THE INVENTION

1. Field of the Invention

The present invention relates to a method for repeatedly using an image holding member in which an image is formed on the image holding member by using toner by an image forming apparatus such as a copying machine, a facsimile telegraph, a printer, etc., and the image holding member is reused by removing this toner from the image holding member.

2. Description of the Related Art

There are generally various kinds of known methods and apparatuses for regenerating an image holding member by removing toner from a sheet of paper as a recorded image holding member. For example, Japanese Patent Application Laying Open (KOKAI) No. 1-101576 shows a toner removing method using a solvent. In this removing method, toner is attached onto a sheet of paper and this paper sheet is dipped into a soluble solvent of toner resin. Then, a supersonic wave is vibrated in this paper sheet so that the toner dissolved into the solvent is separated from a paper face. Japanese Patent Application Laying Open (KOKAI) No. 4-300395 shows another toner removing method. In this removing method, toner is dissolved in a printed portion of a sheet of used paper by attaching a solvent to this printed portion using a dipping, spraying or coating method, etc. The dissolved toner is removed from the printed portion by a method using cleaning, air suction, absorbent contact, mechanical separation or electrostatic adsorption, etc.

In contrast to this, for example, Japanese Patent Application Laying Open (KOKAI) No. 2-255195 shows a toner removing method in which no solvent is used. In this removing method, thermally melted toner is attached onto a printed member by an electrophotographic system or a thermal transfer system. In this printed member, a mold-releasing agent is coated and attached onto a supporting member. This printed member is then overlapped with a toner separating member and is moved between a heating roller and a pressure roller. After this printed member is cooled, the toner separating member is separated from the printed member so that the toner is attached onto the toner separating member and is removed from the printed member. Japanese Patent Application Laying Open (KOKAI) No. 4-64472 shows an eraser having at least an endless sheet, a heating roller, a cooling roller, a pressing roller and a driving section for operating these members in association with each other. The endless sheet has thermally melted resin on a surface thereof. The heating and cooling rollers support and rotate this endless sheet. The pressing roller presses a sheet of erasable paper having a mold-released surface against thermally softened or melted resin. Japanese Patent Application Laying Open (KOKAI) No. 4-82983 shows a toner removing apparatus having two parallel rollers, a heater, a scraper and a separator. The two parallel rollers come in press contact with each other and are rotated such that a sheet of paper passes through a press contact portion of these rollers. The heater heats at least one of these two rollers. The scraper separates the paper sheet passing through the press contact portion from the parallel rollers. The separator removes toner attached onto the parallel rollers from these parallel rollers.

No solvent is used in the above removing method and apparatus. Each of the removing method and apparatus can be used to remove the toner from a recorded image holding member in which an image is recorded onto a sheet of normal paper having exposed paper fibers on a surface thereof. In this case, for example, the toner having thermally melted resin as a principal component is melted and attached onto the image holding member in a fixing process of the electrophotographic system. Therefore, the toner is strongly fixed to paper fibers on a surface of the image holding member. Accordingly, when the toner is removed from the image holding member, the paper fibers are removed from this surface together with the toner so that the paper sheet is damaged and a paper quality is reduced. In particular, when the image holding member on the above toner separating member, the endless sheet or each of the rollers is heated and pressurized to efficiently remove the toner from the image holding member, there is a case in which fixing force between the toner and the image holding member is conversely increased in accordance with various kinds of conditions. In this case, it is difficult to remove the toner from the image holding member.

Therefore, for example, inventors of this application proposed another toner removing method in Japanese patent application No. 4-255916. In this removing method, at least one kind of water or aqueous solution is selected from a group of water as an unstabilizing agent, an aqueous solution including a surfactant, an aqueous solution including a water-soluble polymer, and an aqueous solution including a surfactant and a water-soluble polymer. This selected water or aqueous solution is held in a recorded image holding member and is called a processing liquid in the following description. Toner is heated or pressurized and is adhered to a separating member so that the toner is separated from the image holding member. In this removing method, only the toner can be removed from the image holding member without relatively reducing a paper quality of the image holding member.

However, when the invention of this previous application is embodied, inventors of this application have found that the toner is not completely separated from the image holding member and is left on the image holding member in some kinds of the toner, and fibers on a surface of the image holding member are damaged at a separating time of the toner.

SUMMARY OF THE INVENTION

It is therefore an object of the present invention to provide a method for repeatedly using an image holding member in which an image is formed by using toner suitable for removal from the image holding member so that the toner is relatively easily removed from the image holding member and the image holding member can be repeatedly used while the toner is preferably removed from the image holding member.

In accordance with a first construction of the present invention, the above object can be achieved by a method for repeatedly using an image holding member, comprising the steps of forming an image on a fibrous surface of the image holding member by fixing thermally softened toner onto this fibrous surface by at least heat; removing the thermally softened toner from the image holding member after the image holding member is used as an information holding medium; and reusing the image holding member to form an image; the thermally softened toner being constructed such that a maximum value of viscoelasticity of the thermally softened toner shown by tan δ is equal to or smaller than 3 in the range of a heating temperature when the thermally softened toner is fixed.

In accordance with a second construction of the present invention, the image holding member having the image is impregnated with a liquid which does not dissolve the toner constituting the image; the toner on the image holding member is then heated and attached to a toner separating member having adhesive force stronger than that between the toner and a surface of the image holding member; and the toner is removed from the image holding member by separating the toner from the surface of the image holding member.

In accordance with a third construction of the present invention, the liquid in the second construction is constructed by using at least one kind of water or aqueous solution selected from a group of water, an aqueous solution including a surfactant, an aqueous solution including a water-soluble polymer, and an aqueous solution including a surfactant and a water-soluble polymer.

In accordance with a fourth construction of the present invention, the above object can be also achieved by a method for repeatedly using an image holding member, comprising the steps of forming an image on a fibrous surface of the image holding member by fixing thermally softened toner onto this fibrous surface by at least heat; removing the thermally softened toner from the image holding member after the image holding member is used as an information holding medium; and reusing the image holding member to form an image; the toner being constructed such that a flowing-out starting temperature of the toner is equal to or higher than 100° C.

In accordance with a fifth construction of the present invention, the above object can be also achieved by a method for repeatedly using an image holding member, comprising the steps of forming an image on a fibrous surface of the image holding member by fixing thermally softened toner onto this fibrous surface by heat and/or pressurization; removing the thermally softened toner from the image holding member after the image holding member is used as an information holding medium; and reusing the image holding member to form an image; this method being constructed such that the image holding member having the image is impregnated with a liquid which does not dissolve the toner constituting the image; the toner on the image holding member is then heated and attached to a toner separating member having adhesive force stronger than that between the toner and a surface of the image holding member; and the toner is removed from the image holding member by separating the toner from the surface of the image holding member; the toner being constructed such that a flowing-out starting temperature of the toner is equal to or higher than 100° C.

In accordance with a sixth construction of the present invention, the liquid in the fifth construction is constructed by using at least one kind of water or aqueous solution selected from a group of water, an aqueous solution including a surfactant, an aqueous solution including a water-soluble polymer, and an aqueous solution including a surfactant and a water-soluble polymer.

In each of the above constructions, an image is formed by using toner suitable for removal from the image holding member so that the toner is relatively easily removed from the image holding member and the image holding member can be repeatedly used while the toner is preferably removed from the image holding member.

Further objects and advantages of the present invention will be apparent from the following description of the preferred embodiments of the present invention as illustrated in the accompanying drawings.

DESCRIPTION OF THE PREFERRED EMBODIMENTS

Figure 1:
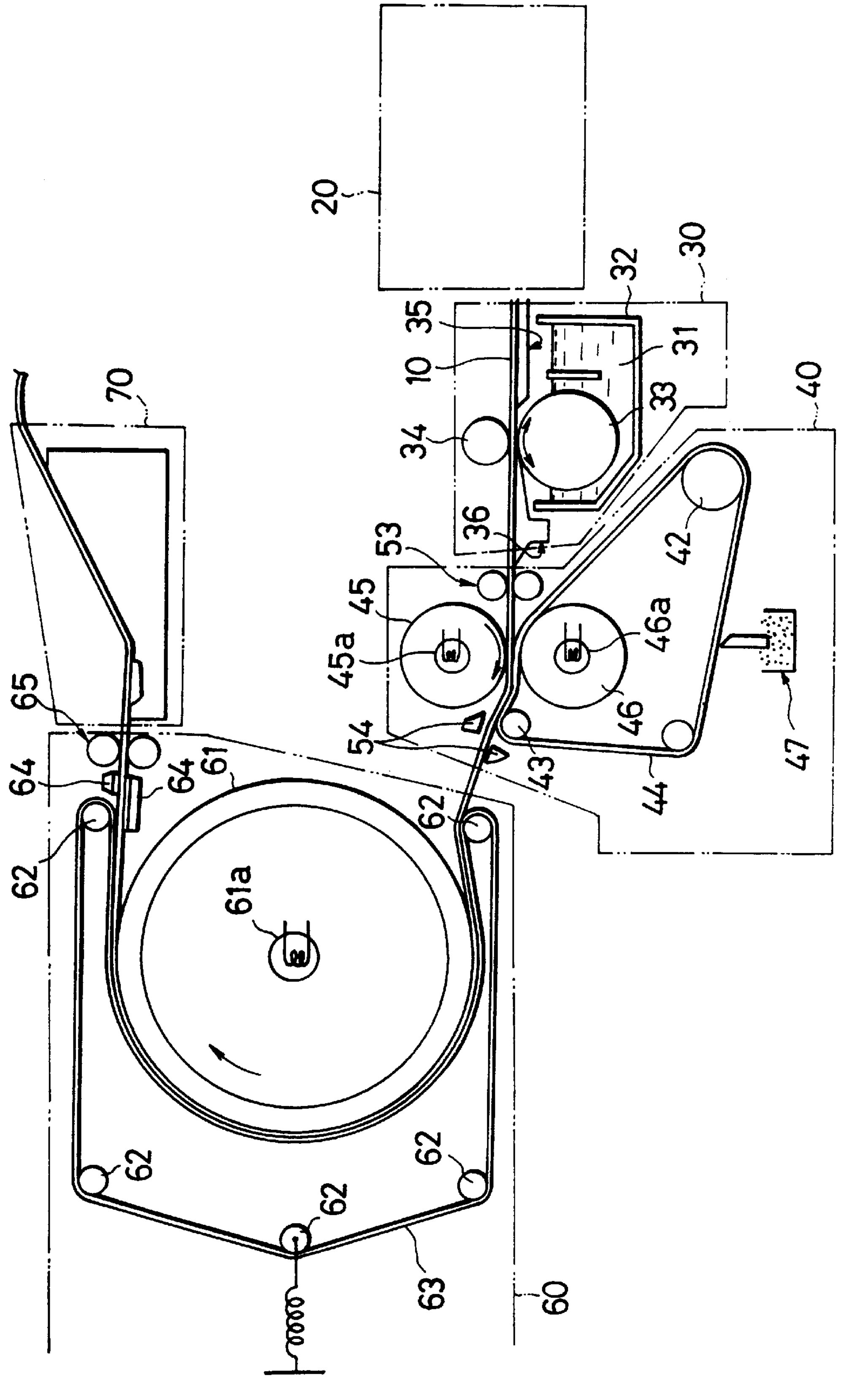
FIG. 1 is a view showing the schematic construction of an apparatus for regenerating paper in accordance with one embodiment of the present invention.

The preferred embodiments of a method for repeatedly using an image holding member in the present invention will next be described in detail with reference to the accompanying drawings.

In the following embodiment of the present invention, an image of toner is formed on a sheet of paper as an image holding member by an electrophotographic copying machine. After this copied material is used as an information holding medium, this paper sheet is reused by removing the toner from this paper sheet so that the paper sheet is repeatedly used.

In this embodiment, a sheet of paper having a toner image is impregnated with an insoluble liquid in a method for regenerating the paper sheet by removing toner from the paper sheet. No toner is dissolved in this insoluble liquid. This insoluble liquid is called a processing liquid in the following description. After this impregnation, the toner is heated and comes in contact with a member having an affinity for toner so that this toner is separated from the paper sheet. The toner for forming an image has characteristics for rapidly and completely separating the toner from the paper sheet without damaging paper fibers by this paper regenerating method. In these characteristics, a maximum value of viscoelasticity (shown by tan δ) of the toner is equal to or smaller than 3 within the range of a heating temperature when the toner is heated, pressurized and fixed in image formation. For example, this heating temperature is ranged from 120° C. to 160° C. Otherwise, in the above characteristics, a flowing-out starting temperature of the toner is set to be equal to or higher than 100° C. Toner having both of these two characteristics is preferably used.

The above paper regenerating method in the present invention will first be explained.

In this paper regenerating method, the paper sheet having a toner image is impregnated with the processing liquid so that adhesive force between the paper sheet and the toner is reduced. This processing liquid is constructed by using a silicon solvent such as dimethyl silicon oil, methyl phenyl silicon oil, etc., an aliphatic hydrocarbon solvent such as isooctane, isododecane, etc., an alcoholic solvent such as methanol, ethanol, etc. Further, the processing liquid can be constructed by using at least one kind of water or aqueous solution selected from a group of water, an aqueous solution including a surfactant, an aqueous solution including a water-soluble polymer, and an aqueous solution including a surfactant and a water-soluble polymer. It is desirable to use the latter water or aqueous solution in view of safety, etc.

The surfactant of the above aqueous solution accelerates permeation of water into an interfacial portion between the paper sheet and the toner. For example, this surfactant is normally constructed by an anionic surfactant such as fatty acid derivative, carboxylate, sulfonate, sulfate, phosphate, phosphonate, etc. This surfactant is also constructed by a cationic surfactant such as amine salt, quaternary ammonium salt, ester bonding amine, quaternary ammonium salt having ether linkage, heterocyclic amine, amine derivative, benzal conium salt, benzethonium chloride, pyridinium salt, imidazolinium salt, sulfonium salt, polyethylene-polyamine, etc. This surfactant is also constructed by an amphoteric surfactant such as amino acid, carboxybetaine, sulfobetaine, amino sulfate, amino carboxylate, imidazoline derivative, etc. This surfactant is also constructed by a nonionic surfactant of ether type, ether-ester type, ester type, nitrogen-including type, polyhydric alcohol, amino alcohol, polyethylene glycol, etc. This surfactant can be also constructed by a fluorosurfactant, etc.

The toner permeates clearances between paper fibers and is not easily adhered to a surface of a separating member described later. The above water-soluble polymer acts as a binder between the separating member surface and the toner permeating clearances between paper fibers so as to efficiently remove this toner. For example, the water-soluble polymer is divided into natural polymer, semi-synthetic polymer, synthetic polymer, etc. The natural polymer is constructed by starch, mannan, seaweeds, plant mucilage, microbiological mucilage and protein. The starch is constructed by sweet potato starch, potato starch, tapioca starch, wheat starch, corn starch, etc. The mannan is constructed by devil's tongue, etc. The seaweeds are constructed by funorin, agar, sodium alginate, etc. The plant mucilage is constructed by hibiscus, tragacanth, gum arabic, etc. The microbiological mucilage is constructed by dextran, levan, etc. The protein is constructed by glue, gelatin, casein, collagen, etc. The semi-synthetic polymer is constructed by cellulose and starch. The cellulose is constructed by viscose, methyl cellulose, ethyl cellulose, hydroxy ethyl cellulose, carboxy methyl cellulose, etc. The starch is constructed by soluble starch, carboxy methyl starch, dialdehyde starch, etc. The synthetic polymer is constructed by polyvinyl alcohol, poly sodium acrylate, polyethylene oxide, isobutylene-maleic anhydride, etc.

In this paper regenerating method, the toner on the paper sheet impregnated with the above processing liquid is heated and is attached to the toner separating member having adhesive force stronger than that between the toner and a surface of the paper sheet. Thus, the toner is separated from the surface of the paper sheet as an image holding member. The toner is desirably heated to such an extent that the toner is softened, but is not melted. The above separating member can be constructed such that a surface of this separating member is formed by toner component resin equal to or similar to the toner, component resin of an adhesive, etc. Further, the separating member can be constructed by using a metallic material such as aluminum, copper, nickel, ion, etc.

For example, the above adhesive for component resin is constructed by each of protein adhesives of glue, gelatin, albumin, casein, etc. This adhesive is also constructed by each of carbohydrate adhesives of starch, cellulose, composite polysaccharide such as gum arabic, tragacanth rubber, etc. This adhesive is also constructed by each of thermoplastic adhesives of polymer and copolymer of vinyl acetate, acrylic, ethylene copolymer, polyamide, polyester, polyurethane, etc. This adhesive is also constructed by each of rubber adhesives of polychloroprene, nitrile rubber, regenerated rubber, SBR, natural rubber, etc. This adhesive is also constructed by each of pressure sensitive adhesives of rubber, acrylic, etc. Further, this adhesive is constructed by polyethylene terephthalate (PET) having dispersed titanium oxide, etc.

FIG. 1 is a view showing the schematic construction of an apparatus for regenerating a paper sheet by using the above paper regenerating method. In FIG. 1, this paper regenerating apparatus has a paper feed unit 20, a liquid supplying unit 30, a toner removing unit 40, a drying unit 60 and a paper receiving unit 70. The paper feed unit 20 separates paper sheets 10 having toner images and stored in a stacking state. The paper feed unit 20 then feeds these paper sheets 10 one by one. The liquid supplying unit 30 supplies a processing liquid to one paper sheet 10 fed from the paper feed unit 20. The toner removing unit 40 removes toner from the paper sheet 10 having the supplied liquid. The drying unit 60 dries the paper sheet 10 from which the toner is removed. The paper receiving unit 70 receives the paper sheet 10 discharged from the drying unit 60.

The above paper feed unit 20 feeds the paper sheets 10 stacked on an unillustrated paper base in a state in which a paper face having a toner image is directed downward. In this case, the paper feed unit 20 feeds the paper sheets 10 from a lowermost paper sheet one by one. In the following description, the paper face having the toner image is called a toner image face. Concrete construction and operation of this paper feed unit 20 are similar to those of a paper feed mechanism arranged in an electrophotographic copying machine. Accordingly, a detailed explanation of this paper feed unit is omitted in the following description.

The above liquid supplying unit 30 supplies an aqueous solution 31 including a surfactant as the processing liquid to the paper sheet 10. This aqueous solution is simply called a liquid in the following description. The liquid supplying unit 30 has a liquid container 32 for storing this liquid, a coating roller 33 and a restricting roller 34. The coating roller 33 is arranged such that this coating roller 33 is partially dipped into the liquid within the liquid container 32. The liquid is drawn up by rotating the coating roller 33 and is supplied to the toner image face of the paper sheet 10. The restricting roller 34 is arranged as a member for restricting the paper sheet such that the restricting roller 34 is opposed to the coating roller 33 through a paper conveying path. The coating roller 33 is rotated at a rotating speed set such that no opposite portion between the coating roller 33 and the paper sheet 10 runs short of the liquid even when a desirable amount of the liquid is provided to the paper sheet 10. Concretely, this desirable amount of the liquid is set to be equal to or greater than 35% of a paper sheet mass, and is preferably set to be 40 to 120% of the paper sheet mass.

The restricting roller 34 is opposed to the coating roller 33 and is rotated in the clockwise direction so as to support and convey the paper sheet 10 between the restricting roller 34 and the coating roller 33. A gap between the restricting roller 34 and the coating roller 33 is set to be thicker than a thickness of the paper sheet 10 in a state in which the paper sheet 10 is increased in size by pressing the paper sheet 10 against a surface of the coating roller 33 or supplying water to the paper sheet 10.

The liquid supplying unit 30 has a first paper guide mechanism 35 and a second paper guide mechanism 36. The first paper guide mechanism 35 guides the paper sheet 10 fed from the paper feed unit 20 to an opposite portion between the coating roller 33 and the restricting roller 34. This opposite portion is called a liquid supplying portion in the following description. The second paper guide mechanism 36 guides the paper sheet 10 passing through the liquid supplying portion to the toner removing unit 40.

The toner removing unit 40 has an offset belt 44 for a toner offset, upper and lower heating rollers 45, 46, and a belt cleaner 47. The offset belt 44 functions as a member for separating toner and is wound around a plurality of supporting rollers 41, 42 and 43. The upper and lower heating rollers 45 and 46 respectively have heating lamps 45*a* and 46*a* therein and are arranged such that the upper and lower heating rollers 45 and 46 come in press contact with each other through the offset belt 44. The belt cleaner 47 removes toner from a surface of the offset belt 44. At least a surface of the offset belt 44 is formed by polyethylene terephthalate (PET) having dispersed titanium oxide as a material for easily attaching softened toner thereto.

A moving direction of the belt is rapidly changed around the small diameter roller 43 among the supporting rollers for supporting the offset belt 44. A belt portion is wound around this small diameter roller 43 after the belt portion passes through a pressurizing portion between the upper and lower heating rollers 45 and 46. Thus, the paper sheet 10 can be separated from the offset belt 44 by using curvature.

Each of the upper and lower heating rollers 45 and 46 makes the toner image face of the paper sheet 10 come in close contact with the offset belt 44 and heats and softens the toner fixed to the paper sheet 10. Each of the upper and lower heating rollers 45 and 46 heats the toner to such an extent that no toner on the paper sheet 10 is melted in a press contact portion between the upper heating roller 45 and the offset belt 44. The upper heating roller 45 heats the toner on the toner image face through the paper sheet 10 until a temperature close to a softening point of this toner. When the toner is excessively heated, the paper sheet 10 is excessively dried while the paper sheet 10 passes through the press contact portion between the upper heating roller 45 and the offset belt 44. Therefore, when a front end portion of the paper sheet 10 separated by using curvature around the small diameter roller 43 through this press contact portion again comes in contact with a surface of the offset belt 44 by its empty weight, etc., there is a fear that the toner once attached to the surface of the offset belt 44 is reattached to the paper sheet 10. Accordingly, the upper heating roller 45 heats the toner to such an extent that the above reattachment of the toner can be prevented by leaving slight moisture in the paper sheet 10 after the paper sheet 10 passes through a heating portion. For example, this moisture is provided in a liquid including ratio from 12 to 63% set such that a liquid approximately having 0.5 to 2.5 g in weight is included in the case of a paper sheet having A4 in size and 4 g in weight. Concretely, turning-on and turning-off operations of the built-in heating lamp 45*a* are controlled such that a surface temperature of the upper heating roller 45 is maintained at a set temperature approximately ranged from 80° C. to 115° C.

The lower heating roller 46 is arranged to soften the toner fixed to the paper sheet 10 together with the upper heating roller 45. The lower heating roller 46 also heats the toner such that no paper sheet 10 is excessively heated. Concretely, turning-on and turning-off operations of the built-in heating lamp 46*a* are controlled such that a surface temperature of a separating roller is maintained at a set temperature approximately ranged from 70° C. to 115° C.

The toner removing unit 40 has a relay conveying roller pair 53 as a supporting conveying means for feeding the paper sheet 10 from the liquid supplying unit 30 to the pressurizing portion. The toner removing unit 40 also has upper and lower guide members 54. The paper sheet 10 separated by using curvature from the offset belt 44 around the small diameter roller 43 through the pressurizing portion is guided to the drying unit 60 by these upper and lower guide members 54.

A linear velocity of the relay conveying roller pair 53 in the toner removing unit 40 is set to be higher than the linear velocity of a paper feed conveying roller pair 24 by an extending amount (such as 3% mentioned above) of the paper sheet 10 caused by liquid permeation. Concretely, the linear velocity of the paper feed conveying roller pair 24 is set to 49.5 mm/sec. The linear velocity of the relay conveying roller pair 53 in the toner removing unit 40 is set to 51.0 mm/sec. Linear velocities of the upper heating roller 45 and the offset belt 44 in the press contact portion therebetween are set to be slightly higher than the linear velocity of the relay conveying roller pair 53 in the toner removing unit 40.

For example, the drying unit 60 dries the paper sheet 10 such that a liquid holding amount of the paper sheet 10 is equal to or smaller than 10% of paper weight. The drying unit 60 is constructed by a heating drum 61 and a belt 63 for pressing the paper sheet 10. For example, the heating drum 61 has a heating lamp 61*a* therein and is made of aluminum. The paper pressing belt 63 is wound around a plurality of supporting rollers 62 and is endlessly moved in a state in which the paper pressing belt 63 is wound around a circumferential face of the heating drum 61 by a constant angle. In the example shown in FIG. 1, one supporting roller 62 also functions as a tension roller. Upper and lower guide members 64 guide the paper sheet 10 fed from a supporting portion between the heating drum 61 and the paper pressing belt 63. A discharging roller 65 discharges the paper sheet 10 to the paper receiving unit 70.

In the above construction, the above liquid is uniformly supplied by the liquid supplying unit 30 to the toner image face of the paper sheet 10 fed from the paper feed unit 20. This paper sheet 10 is then fed to the toner removing unit 40. In the toner removing unit 40, the toner fixed to the paper sheet is heated and softened by the heating rollers 45 and 46 so that the toner is attached to a surface of the offset belt 44. When the paper sheet 10 is separated from the offset belt 44 around the small diameter roller 43, toner attached to the surface of the offset belt 44 is separated from the paper sheet 10 so that the toner is removed from the paper sheet 10. The paper sheet removing the toner therefrom is then dried by the drying unit 60 and is discharged to the paper receiving unit 70. In this paper regenerating apparatus, the liquid is supplied to the paper sheet having the attached toner and this toner is heated and separated in a state in which the liquid permeates an interfacial portion between the paper sheet and the toner. Accordingly, the toner can be removed from the paper sheet without damaging paper fibers.

The next explanation relates to toner for image formation which is suitable for repeated use of the paper sheet in this embodiment. In this embodiment, when toner is removed from the paper sheet by the above paper regenerating method, characteristics of the toner for image formation are set such that the toner can be removed rapidly and completely without damaging paper fibers. As mentioned above, in these characteristics, a maximum value of viscoelasticity (shown by tan $\delta$) of the toner is equal to or smaller than 3 within the range of a heating temperature when the toner is heated, pressurized and fixed in the image formation. For example, this heating temperature is ranged from 120° C. to 160° C. Otherwise, in these characteristics, a flowing-out starting temperature of the toner is set to be equal to or higher than 100° C. Toner having both of these two characteristics is preferably used.

It is found that such toner is preferable by searching and comparing toner damaging paper fibers in toner separation and causing unremoval of the toner, etc. with toner causing no such problems. Namely, the inventors of this application noticed viscoelasticity and a flowing-out starting temperature i.e., the flow beginning temperature, the temperature at which toner begins to flow. Therefore, various kinds of toners having characteristics different from those of the general toner are prepared, adjusted, manufactured and compared with each other in experiments with respect to viscoelasticity and a flowing-out starting temperature of each of these toners. As a result, it is found that toner suitable for prevention of the above problems has viscoelasticity provided in the above range and the above flowing-out starting temperature.

The viscoelasticity of the toner is concretely set to viscoelasticity shown by tan δ in the heating temperature range when the toner is heated, pressurized and fixed in image formation. Further, thermal characteristics of the toner are noticed in this embodiment. The reasons for this are as follows. No sufficient cohesive force of the toner can be obtained when the toner has no sufficient elasticity and the flowing-out starting temperature of the toner is low at the heating, pressurizing and fixing times. In this case, paper fibers on a paper face eat into the toner by heating, pressurizing and fixing the toner. Accordingly, the paper fibers and the toner are strongly coupled to each other. As a result, when the toner is separated from the paper sheet through a toner separating member for regenerating the paper sheet, there is a possibility that a toner layer is interrupted midway so that an unremoved portion of the toner is left on the paper sheet. Further, there is a possibility that a portion of paper fibers is also separated from the paper sheet through the toner so that the paper sheet is damaged.

From results of the above comparing experiments, it is found that toner having the above ranges with respect to characteristics of viscoelasticity and the flowing-out starting temperature is suitable.

As is well known, the toner is more elastic as a value of viscoelasticity shown by tan δ is smaller. In an experiment, this viscoelasticity is measured by using a reometrics dynamic spectrometer of an RDS-7700 type manufactured by REOMETRICS INC. In a measuring condition, an angular frequency ω is fixedly set to 100 (red./sec) and a distortion factor is automatically set. The viscoelasticity is measured every 5° C. by raising the toner temperature from 100° C. to 200° C. Thus, a maximum value of the viscoelasticity is calculated. The flowing-out starting temperature is obtained by using the temperature of a sample at a point of inflection reaching a flowing-out regional temperature in a temperature raising method using a flow tester CFT-500C manufactured by SHIMAZU SEISAKUSHO in Japan. In the measuring condition, the diameter of a die hole is set to 0.5 mm, the length of a die is set to 1 mm, a weighted value of the die is set to 10 kg, and a temperature raising speed is set to 3° C./min.

A material of the toner in the present invention may be set to be equal to that of the normal toner.

For example, a charging control agent is constructed by nigrosine, quaternary ammonium salt, azo dye including a metal, salicylic acid derivative, a phenol compound, etc.

Binding resin for toner used so far can be basically applied to binding resin used in the present invention. Concretely, the binding resin is constructed by a monopolymer of styrene and a substitution product thereof such as polystyrene, polychloro ethylene, polyvinyl toluene, etc. The binding resin is also constructed by a styrene copolymer such as a styrene-P-chloro styrene copolymer, a styrene-propylene copolymer, a styrene-vinyl toluene copolymer, a styrene-vinyl naphthalene copolymer, a styrene-methyl acrylate copolymer, a styrene-ethyl acrylate copolymer, a styrene-butyl acrylate copolymer, a styrene-octyl acrylate copolymer, a styrene-methyl methacrylate copolymer, a styrene-ethyl methacrylate copolymer, a styrene-butyl methacrylate copolymer, a styrene-α-chlormethyl methacrylate copolymer, a styrene-acrylonitrile copolymer, a styrene-vinyl methyl ether copolymer, a styrene-vinyl ethyl ether copolymer, a styrene-vinyl methyl ketone copolymer, a styrene-butadiene copolymer, a styrene-isoprene copolymer, a styrene-acrylonitrile-indene copolymer, a styrene-maleic acid copolymer, a styrene-maleate copolymer, etc. The binding resin is also constructed by polymethyl methacrylate, polybutyl methacrylate, polyvinyl chloride, polyvinyl acetate, polyethylene, polypropylene, polyester, polyvinyl butyl butyral, polyacrylic acid resin, rosin, modified rosin, terpene resin, phenol resin, aliphatic or alicyclic hydrocarbon resin, aromatic petroleum resin, chlorinated paraffin, paraffin wax, etc. The binding resin may be constructed by independently using each of these materials or mixing two or more kinds of these materials with each other. In this case, the ranges of a molecular weight, a molecular weight distribution and a bridge forming degree of each of these resins, etc. are determined such that melt viscosity of the toner is equal to a predetermined value.

All pigments, dyes and polarity control agents generally used so far can be used as pigments and dyes used in the present invention. Concretely, each of the pigments and dyes used in the present invention can be constructed by ultramarine blue, nigrosine dye, aniline blue, chalcooil blue, Dupont oil red, quinoline yellow, methylene blue chloride, phthalocyanine blue, phthalocyanine green, Rhodamine 6C lake, quinacridon, benzidine yellow, Malachanide green, Hansa yellow G, Malachite green hexalate, oil black, azo oil black, rose bengal, monoazo dye pigment, disazo dye pigment, trisazo dye pigment, quaternary ammonium salt, a metallic salt of salicylic acid and a salicylic acid derivative, a mixture thereof, etc.

A mold-releasing agent may be included in the toner used in the present invention. The mold-releasing agent may be constructed by a synthetic wax having a low molecular weight such as polyethylene, polypropylene, etc. The mold-releasing agent may be also constructed by a plant wax such as candelila w ax, carnauba wax, rice wax, Japan wax, jojoba oil, etc. The mold-releasing agent may be also constructed by an animal wax such as beeswax, lanolin, spermaceti, etc. The mold-releasing agent may be also constructed by a mineral wax such as montan wax, ozokerite, etc. The mold-releasing agent may be also constructed by wax of fats and oils such as hardened castor oil, hydroxy stearic acid, fatty acid amide, phenol fatty acid ester, etc. Further, various kinds of assistants such as plasticizers (dibutyl phthalate, dioctyl phthalate, etc.) and resistance adjusting agents (tin oxide, lead oxide, antimony oxide, etc.) can be added to the toner in the present invention in addition to each of the above components in accordance with necessity so as to adjust heating, electric and physical characteristics of the toner, etc.

An additive except for the above resins for the toner and a coloring agent may be mixed with the toner in the present invention in accordance with necessity. For example, this additive may be constructed by a material for fluidizing the toner such as colloidal silica, titanium oxide, aluminum oxide, etc. Each of primary particles of the fluidizing agent has a diameter smaller than 0.1 μm and a surface of the fluidizing agent is preferably processed by hydrophobic processing using a silane coupling agent, silicon oil, etc.

Concrete examples and a comparing example of the toner in the present invention will next be explained. In the following explanation, a part shows a weight part, Mn shows a numerical mean molecular weight of resin, Mw shows a weight average molecular weight, and Tg shows a glass transition point. Accordingly, Mw/Mn shows a dispersion ratio.

[Concrete example 1]

| | |
|---|---|
| styrene-butyl methacrylate copolymer (copolymer ratio 93/7) Mn 3500 Mw/Mn 52 Tg 68° C. | 90 parts |
| carbon black | 10 parts |
| quaternary ammonium salt (Bontron P51 manufactured by Orient Chemical) | 2 parts |
| polypropylene wax (sunwax 660P manufactured by Sanyo Kasei in Japan) | 2 parts |

The above material is mixed by a mixer and is then melted and kneaded by two roll mills. The kneaded material is rolled and cooled and is then ground and classified so that particles having an average diameter of 11 μm are obtained. Viscoelasticity of the obtained toner particles shown by tan δ is measured. A measured value of this viscoelasticity is equal to 2.1 irrespective of temperature. Further, a flowing-out starting temperature of the toner is equal to 151° C. The obtained toner is mixed with silicon coat carriers so that a two-component developer is made. An image is formed by using this developer and a PPC copying machine FT4525 manufactured by RICHO in Japan. An obtained copied material is fed to the paper regenerating apparatus shown in FIG. 1 and the toner is removed from the copied material as a paper sheet by this paper regenerating apparatus. As a result, no unremoved toner is left on the paper sheet and no fluffy portion of the paper sheet is observed. In this PPC copying machine FT4525 manufactured by RICHO, a set temperature of a heating-fixing device for heating and fixing the toner is equal to 190° C. and has a slight temperature width changed in accordance with a change in environment.

[Concrete example 2]

| | |
|---|---|
| styrene-n-butyl methacrylate copolymer (copolymer ratio 93/7) Mn 43000 Mw/Mn 2.4 Tg 68° C. | 90 parts |
| carbon black | 10 parts |
| quaternary ammonium salt (TP302 manufactured by Hodogaya Chemical in Japan) | 2 parts |
| polypropylene wax (sunwax 660P manufactured by Sanyo Kasei in Japan) | 2 parts |

Toner is made by using the above material in procedures similar to those in the concrete example 1. Viscoelasticity of obtained toner particles shown by tan δ is measured. A measured value of this viscoelasticity tends to be simply increased in accordance with temperature. A maximum value of this viscoelasticity is equal to 3.8 at a temperature of 200° C. A flowing-out starting temperature of this toner is equal to 138° C. The obtained toner is mixed with silicon coat carriers so that a two-component developer is made. An image is formed by using this developer and the above PPC copying machine FT4525 manufactured by RICHO in Japan. An obtained copied material is fed to the paper regenerating apparatus shown in FIG. 1 and the toner is removed from the copied material as a paper sheet by this paper regenerating apparatus. As a result, no unremoved toner is left on the paper sheet, but a slight fluffy portion of the paper sheet is observed.

[Concrete example 3]

| | |
|---|---|
| styrene-n-butyl methacrylate copolymer (copolymer ratio 83/17) Mn 26000 Mw/Mn 2.0 Tg 70° C. | 90 parts |
| carbon black | 10 parts |
| azo dye including chromium (Bontron S34 manufactured by Orient Chemical) | 2 parts |
| polypropylene wax (sunwax 660P manufactured by Sanyo Kasei in Japan) | 2 parts |

Toner is made by using the above material in procedures similar to those in the concrete example 1. Viscoelasticity of obtained toner particles shown by tan δ is measured and does not change relatively with respect to temperature. A maximum value of this viscoelasticity is equal to 2.8 at a temperature of 140° C. A flowing-out starting temperature of this toner is equal to 98° C. The obtained toner is mixed with silicon coat carriers so that a two-component developer is made. An image is formed by using this developer and a digital PPC copying machine IMAGIO MF530 manufactured by RICHO in Japan. An obtained copied material is fed to the paper regenerating apparatus shown in FIG. 1 and the toner is removed from the copied material as a paper sheet by this paper regenerating apparatus. As a result, no unremoved toner is left on the paper sheet, but a slight fluffy portion of the paper sheet is observed. In this digital PPC copying machine IMAGIO MF530 manufactured by RICHO, a set temperature of a heating-fixing device for heating and fixing the toner is equal to 180° C. and has a slight temperature width changed in accordance with a change in environment.

[Comparing example]

| | |
|---|---|
| styrene-n-butyl methacrylate copolymer (copolymer ratio 7/3) Mn 26000 Mw/Mn 2.0 Tg 70° C. | 90 parts |
| carbon black | 10 parts |
| quaternary ammonium salt (Bontron P51 manufactured by Orient Chemical) | 2 parts |
| polypropylene wax (sunwax 660P manufactured by Sanyo Kasei in Japan) | 2 parts |

Toner is made by using the above material in procedures similar to those in the concrete example 1. Viscoelasticity of obtained toner particles shown by tan δ is measured. A maximum value of this viscoelasticity is equal to 6.6 at a temperature of 170° C. A flowing-out starting temperature of this toner is equal to 98° C. The obtained toner is mixed with silicon coat carriers so that a two-component developer is made. An image is formed by using this developer and the above PPC copying machine FT4525 manufactured by RICHO in Japan. An obtained copied material is fed to the paper regenerating apparatus shown in FIG. 1 and the toner is removed from the copied material as a paper sheet by this paper regenerating apparatus. As a result, unremoved toner is left on the paper sheet and a fluffy portion of the paper sheet is also observed.

The above description relates to concrete examples and a comparing example of the paper regenerating apparatus shown in FIG. 1 in which an aqueous solution including a surfactant as the processing liquid 31 is used. A copied material having an image formed by toner in the present invention can be also preferably regenerated by using the paper regenerating apparatus in which the above-mentioned solvent is used as the processing liquid 31.

[Concrete example 4]

For example, a copied material in the concrete example 1 is fed to the paper regenerating apparatus shown in FIG. 1 when a dimethyl silicon solvent SH200 (1 cp) manufactured by Tohre Dauconing Silicon Co., Ltd. is used in the liquid supplying unit 30. Toner is then removed from the copied material as a paper sheet by this paper regenerating apparatus. As a result, no unremoved toner is left on the paper sheet and no fluffy portion of the paper sheet is observed.

In the above example, thermally softened toner is fixed to a paper sheet by heat and pressurization. This toner is removed from the paper sheet having an image in a toner removing method using heat. When the toner in the present invention is used, the paper sheet can be preferably used repeatedly in comparison with the general method as long as a method for repeatedly using the paper sheet by heating the thermally softened toner is used in at least one of a fixing process for forming an image and a toner removing process for regenerating the paper sheet. Namely, the image forming method is not limited to an electrophotographic system if the thermally softened toner is used. For example, the image forming method may be used in a magnetic printing system and an electrostatic printing system. Further, it is possible to use an image forming method for forming an image by handwriting such as pressurization using a handwriting tool in which the softened toner formed by colored and softened particulates is solidified by wax. In a method for regenerating the paper sheet by removing the toner from the paper sheet, the toner removing method is not limited to a method for separating the toner from the paper sheet by heating the toner and making the toner come in contact with a member having an affinity for the toner after the toner on the paper sheet having a toner image is impregnated with the processing liquid. In this case, various kinds of toner removing methods can be used. For example, it is possible to use the above-mentioned general well-known toner removing method using supersonic vibration. It is also possible to use a method for mechanically separating and removing toner without using any solvent. However, the toner removing method in the above embodiment is optimum since no paper fibers are damaged in toner removal.

[Concrete example 5]

For example, the following material is mixed by using a mixer.

| | |
|---|---|
| styrene-n-butyl methacrylate copolymer (copolymer ratio 93/7) Mn 3500 Mw/Mn 52 Tg 68° C. | 90 parts |
| carbon black | 10 parts |

Thereafter, this material is melted and kneaded by two roll mills. The kneaded material is rolled and cooled and is then ground so that particles having an average diameter of 6 $\mu$m are obtained. Viscoelasticity of the obtained colored particles shown by tan δ is measured. A measured value of this viscoelasticity is equal to 1.8 irrespective of temperature. A flowing-out starting temperature of this material is 157° C. 100 parts of these particles are mixed with 10 parts of calcium carbonate particulates and 30 parts of paraffin wax by a mixer. Then, these materials are pressurized and molded so that a handwriting tool having a stick shape is obtained. A printed material written with this handwriting tool is fed to the paper regenerating apparatus shown in FIG. 1 and toner is removed from this printed material as a paper sheet. As a result, no unremoved toner is left on the printed material and no fluffy portion of the printed material is observed.

Figure 2:
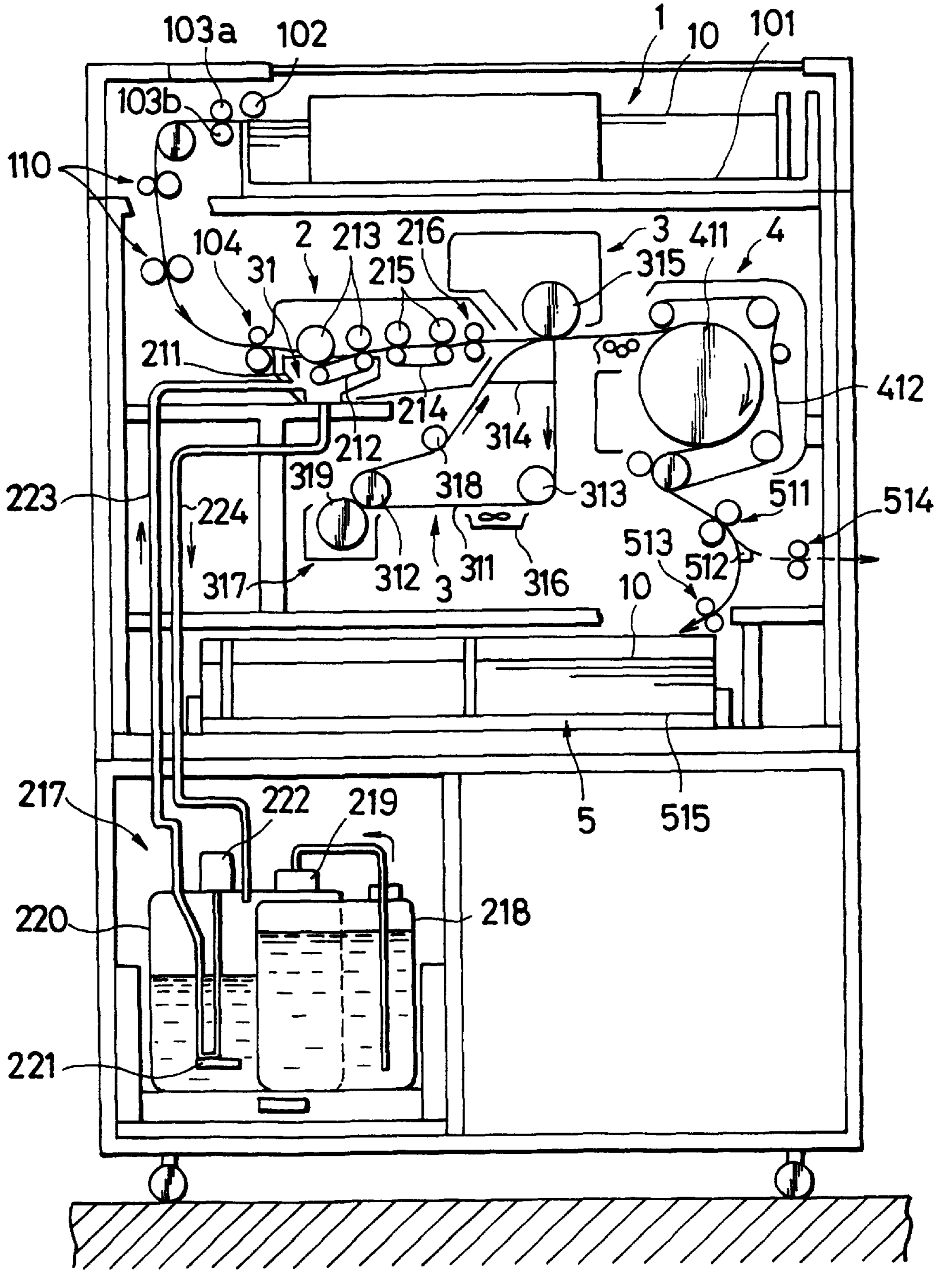
FIG. 2 is a view showing the schematic construction of an apparatus for regenerating paper in accordance with another embodiment of the present invention.

FIG. 2 shows another constructional example of the paper regenerating apparatus to which the present invention can be applied.

This paper regenerating apparatus has a paper feed unit 1, a liquid providing unit 2, a toner separating unit 3, a drying unit 4 and a paper receiving unit 5. The paper feed unit 1 separates transfer paper sheets 10 having toner images and stored in a stacking state. The paper feed unit 1 then feeds these transfer paper sheets 10 one by one. The liquid providing unit 2 supplies the above liquid 31 to one transfer paper sheet 10 fed from the paper feed unit 1. The toner separating unit 3 separates and removes toner from the transfer paper sheet 10 having the supplied liquid. The drying unit 4 dries the transfer paper sheet 10 from which the toner is removed. The paper receiving unit 5 receives the transfer paper sheet 10 discharged from the drying unit 4.

The paper feed unit 1 feeds the transfer paper sheets 10 stacked on a bottom plate 101 from an uppermost paper sheet by a paper feed roller 102. Overlapped transfer paper sheets are separated from each other by a separating mechanism constructed by a feed roller 103*a* and a separating roller 103*b* so that the paper feed unit 1 feeds only one transfer paper sheet 10. This transfer paper sheet 10 fed from the paper feed unit 1 is conveyed by a conveying roller pair 110 and is then fed to the next liquid providing unit 2 by making a timing adjustment and a skew correction of the transfer paper sheet 10 by a resist roller pair 104.

The liquid providing unit 2 has a liquid container 211, a liquid interior belt conveying portion 212, a brush roller 213, a belt conveying portion 214, a brush roller 215, a wringing roller pair 216, a liquid supplying device 217, an unillustrated driving section, etc. The liquid container 211 is filled with a predetermined amount of the liquid 31. The liquid interior belt conveying portion 212 is constructed by a round belt wound around supporting rollers and rotated by these supporting rollers in a state in which the round belt is dipped into the liquid 31 of the liquid container 211. The brush roller 213 is opposed to the liquid interior belt conveying portion 212 through the transfer paper sheet 10. The belt conveying portion 214 and the brush roller 215 are arranged such that the belt conveying portion 214 and the brush roller 215 conveys the transfer paper sheet 10 having the provided liquid. The wringing roller pair 216 removes a surplus amount of the liquid 31 provided to the transfer paper sheet 10. The liquid supplying device 217 supplies the liquid 31 to the liquid container 211. The unillustrated driving section operates the liquid interior belt conveying portion 212, etc.

The liquid supplying device 217 is constructed by an exchangeable replenishing liquid bottle 218, a tank 220, a liquid supplying pump 221, a pump motor 212, a liquid supplying pipe 223, a liquid discharging pipe 224, etc. The liquid 31 is suitably supplied by an electromagnetic pump 219 from the replenishing liquid bottle 218 to the tank 220. The liquid supplying pump 221 is constructed by a blade pump, etc. arranged within the tank 220. The liquid supplying pump 221 is rotated by the pump motor 212. The liquid supplying pipe 223 is arranged to supply the liquid 31 from the liquid supplying pump 221 to the liquid container 211. The liquid discharging pipe 224 is arranged to return the liquid 31 discharged from a discharging port arranged in a lower portion of the liquid container 211 into the tank 220. In this construction, the liquid 31 fed by the liquid supplying pump 221 is supplied to the liquid container 211 through the liquid supplying pipe 223. The liquid 31 discharged from the discharging port of the liquid container 211 is returned into the tank 220 through the liquid discharging pipe 224 so that the liquid 31 is circulated. When the liquid 31 is steadily circulated, a liquid supplying amount of the liquid supplying pump 221, etc. are set such that the liquid interior belt conveying portion 212 is dipped into the liquid 31 within the liquid container 211.

The toner separating unit 3 has an offset belt 311, a heating block 314, an upper heating roller 315, a blowing fan 316, a cleaner 317 and a wiping roller 318. The offset belt 311 constitutes a separating member formed in the shape of a belt and wound around a plurality of supporting rollers 312, 313, etc. Each of the heating block 314 and the upper heating roller 315 has a heating lamp therein and is arranged such that the heating block 314 and the upper heating roller 315 come in press contact with each other through the offset belt 311. The blowing fan 316 constitutes a means for cooling toner attached onto a surface of the offset belt 311. The cleaner 317 removes the toner from the surface of the offset belt 311. The wiping roller 318 wipes the surface of the offset belt 311 after the offset belt 311 is cleaned by the cleaner 317. The wiping roller 318 also provides a predetermined tensile force to this offset belt 311.

The heating block 314 and the upper heating roller 315 make a toner image face of the transfer paper sheet 10 come in close contact with the offset belt 311. The heating block 314 and the upper heating roller 315 also heat and soften the toner fixed to the transfer paper sheet 10.

The offset belt 311 is formed by a material having adhesive force stronger than that between a surface of the transfer paper sheet 10 and the softened toner coming in contact with a contact side face of the offset belt 311. For example, the offset belt 311 is formed by a metallic material including aluminum, copper, nickel, etc., or a high molecular material such as polyethylene terephthalate (PET) having diffused titanium oxide.

A bending portion is formed on a downstream side in a moving direction of the offset belt 311 from a press contact portion between the heating block 314 and the upper heating roller 315. The bending portion has a predetermined radius of curvature and changes the moving direction of the offset belt 311 approximately 90 degrees. The moving direction of the offset belt 311 is rapidly changed around this bending portion so that the transfer paper sheet 10 is separated from the offset belt 311 by using curvature.

The blowing fan 316 cools toner on the offset belt 311 heated by the heating block 314, etc. and having large viscosity. Thus, the toner is solidified so that the toner is easily removed from the offset belt 311 by the cleaner 317.

The cleaner 317 mechanically separates and removes the attached toner from the surface of the offset belt 311 by a brush roller 319 having a metallic brush on a surface thereof. For example, this metallic brush is formed by a loop brush made of stainless steel. This brush roller 319 is biased toward the surface of the offset belt 311 by a pressurizing spring omitted in FIG. 2. A metallic blade may be arranged on a downstream side from this brush roller 319 in the moving direction of the offset belt 311.

The wiping roller 318 is formed by a material constructed such that at least a surface portion of this wiping roller 318 can have preferable wiping effects. For example, the wiping roller 318 is formed by winding a cloth, etc. around a circumferential face of a body of the wiping roller 318. In this example, no wiping roller 318 is normally rotated together with the surface of the offset belt 311 and a contact portion of the wiping roller 318 coming in contact with the surface of the offset belt 311 is changed by rotating the wiping roller 318 by a predetermined angle in suitable timing such that sufficient wiping effects of the wiping roller 318 are obtained for a long period. This construction of the wiping roller 318, etc. will be described later.

For example, the drying unit 4 dries the transfer paper sheet 10 such that a liquid holding amount of the transfer paper sheet 10 is equal to or smaller than 10% of paper weight. The drying unit 4 is constructed by a heating drum 411 and a belt 412 for pressing paper. For example, the heating drum 411 has a heating lamp therein and is made of aluminum. The paper pressing belt 412 is wound around a plurality of supporting rollers and is endlessly moved in a state in which the paper pressing belt 412 is wound around a circumferential face of the heating drum 411 by a predetermined angle. This paper pressing belt 412 can be constructed by a material having a heat resisting property and a gas permeable property. For example, this material is formed by using a cloth such as canvas texture, cotton texture, tetronic texture, etc.

The paper receiving unit 5 is constructed by a conveying roller pair 511, a branching claw 512, discharging roller pairs 513, 514, a built-in paper discharging tray 515, an unillustrated exterior paper discharging tray, etc. for conveying the transfer paper sheet 10 from the drying unit 4. The transfer paper sheet 10 can be selectively discharged onto the built-in paper discharging tray 515 or the exterior paper discharging tray in accordance with necessity. The built-in paper discharging tray 515 is slidably constructed such that the built-in paper discharging tray 515 can be pulled out on this side of the paper regenerating apparatus.

In the paper regenerating apparatus having the above construction, the liquid 31 is provided by the liquid providing unit 2 onto a toner image face of the transfer paper sheet 10 fed from the paper feed unit 1. For example, the toner image face of the transfer paper sheet 10 is set to a lower face thereof in FIG. 2. This transfer paper sheet 10 is then fed to the toner separating unit 3. Toner fixed onto the transfer paper sheet 10 is heated and softened by the heating block 314 and the upper heating roller 315 in this toner separating unit 3 so that this toner is attached onto a surface of the offset belt 311. When the transfer paper sheet 10 is separated from the offset belt 311 around the bending portion of the heating block 314, the toner attached to the surface of the offset belt 311 is separated from the transfer paper sheet 10 so that the toner is removed from the transfer paper sheet 10. The transfer paper sheet 10 removing the toner therefrom is then dried by the drying unit 4 and is discharged onto the built-in paper discharging tray 505 of the paper receiving unit 5 by the paper discharging roller pair 503. Thus, a liquid is supplied to the transfer paper sheet 10 attaching the toner thereto and the toner is separated from the transfer paper sheet 10 in a state in which this liquid permeates an interfacial portion between the toner and the transfer paper sheet 10. Accordingly, the toner can be removed from the transfer paper sheet 10 without damaging fibers of the transfer paper sheet 10.

With respect to the wiping roller 318, a one-way clutch is inserted into at least one of bearings 80*b* and 80*c* such that both shaft portions of the wiping roller 318 are rotatably supported by an unillustrated side plate of the paper regenerating apparatus and no wiping roller 318 is rotated together with the surface of the offset belt 311 moved and rotated in a normal direction shown by an arrow in FIG. 2. A driving roller 41 of the offset belt 311 can be rotated in a reverse direction to suitably rotate the wiping roller 318. In this construction, the wiping roller 318 comes in press contact with the surface of the offset belt 311 in a state in which the rotation of the wiping roller 318 caused by rotating the offset belt 311 is normally restricted by the above one-way clutch and is stopped. Accordingly, the wiping roller 318 sufficiently comes in frictional contact with the surface of the offset belt 311 so that the wiping roller 318 also wipes off paper powder, a brushing component of the brush roller 50, etc. This brushing component includes copper and zinc when brass is used as the brush roller 50. The driving roller 41 is reversely rotated by a constant angle in timing in which no transfer paper sheet 10 is fed from the liquid supplying unit 30 to a pressurizing portion between the upper heating roller 315 and a portion of the offset belt 311 moved by backup of at least the heating block 314. For example, the driving roller 41 is reversely rotated by a constant angle after a series of transfer paper sheets 10 has passed through this pressurizing portion. Then, the offset belt 311 is reversely moved by a constant amount. The wiping roller 318 is rotated by a constant amount in the direction of an arrow B by this reverse movement of the offset belt 311. For example, this constant amount of the wiping roller 318 is set to 60°. Thus, a contact portion of the wiping roller 318 coming in contact with the offset belt 311 is changed so that a new face of the wiping roller 318 comes in contact with this offset belt 311.

As mentioned above, in a method for repeatedly using an image holding member in accordance with each of first to third constructions of the present invention, an image is formed by fixing thermally softened toner to a fibrous surface of the image holding member by heat and pressurization. In a process for fixing this thermally softened toner, a certain thermally softened toner is fluidized by heat so that no elasticity of the toner can be sufficiently fulfilled. In this case, fibers of the image holding member excessively eat into the toner, or the toner permeates the fibers. Therefore, the toner is fixed excessively and strongly to a surface of the image holding member. Accordingly, it is difficult to remove the toner from the image holding member so as to repeatedly use the image holding member later. For example, the toner is fixed excessively and strongly to the image holding member surface in a toner removing method for removing the toner from the image holding member by using the above toner separating member. Therefore, when the toner is separated from the image holding member, a toner layer is interrupted midway so that unremoved toner is left on the image holding member. In contrast to this, in the method for repeatedly using the image holding member in the present invention, no toner is greatly fluidized by maintaining viscoelasticity of this toner shown by tan δ at a value equal to or smaller than 3 even at a heating temperature of this toner when the toner is fixed. Accordingly, no toner is fixed excessively and strongly to the image holding member surface while the toner practically has a sufficient fixing property. Therefore, the image holding member can be repeatedly used while the toner is relatively preferably removed from the image holding member.

In particular, in the method for repeatedly using the image holding member in accordance with the second or third construction of the present invention, the toner is heated on the image holding member after the image holding member is impregnated with a liquid. Further, the toner is attached to the toner separating member having adhesive force stronger than that between the toner and the image holding member surface. Thus, the toner is separated and removed from the image holding member surface through the toner separating member. Accordingly, the image holding member can be regenerated by removing the toner therefrom without damaging any fibrous surface of the image holding member in comparison with the general well-known removing method.

Further, elasticity of the toner is also sufficiently fulfilled when the toner is heated in removal from the image holding member. Accordingly, when the toner is separated from the image holding member, no toner layer is interrupted midway so that no unremoved toner is left on the image holding member. Further, no image holding member is damaged by separating a portion of fibers from the image holding member surface through the toner.

In a method for repeatedly using an image holding member in accordance with each of fourth to sixth constructions of the present invention, toner is heated in at least one processing of fixation to the image holding member and toner removal from the image holding member. A certain toner is fluidized when this toner is heated in fixation as mentioned above. In this case, this toner is fixed excessively and strongly to a surface of the image holding member. Further, no cohesive force of the toner can be sufficiently fulfilled when the toner is removed from the image holding member to repeatedly use this image holding member later. In this case, a toner layer is interrupted midway and unremoved toner is left on the image holding member. In contrast to this, a flowing-out starting temperature of toner is set to be equal to or higher than 100° C. in the method for repeatedly using the image holding member in the present invention. Therefore, no toner is fixed excessively and strongly to the image holding member by the above fixation. Further, cohesive force of the toner can be sufficiently fulfilled when the toner is removed from the image holding member. Accordingly, the image holding member can be repeatedly used while the toner is relatively preferably removed from the image holding member.

In particular, in the method for repeatedly using the image holding member in accordance with the fifth or sixth construction of the present invention, toner is heated on the image holding member after the image holding member is impregnated with a liquid. Further, the toner is attached to a toner separating member having adhesive force stronger than that between the toner and an image holding member surface. Thus, the toner is separated and removed from the image holding member surface through the toner separating member. Accordingly, the image holding member can be regenerated by removing the toner therefrom without damaging any fibrous surface of the image holding member in comparison with the general well-known removing method.

Further, cohesive force of the toner is also sufficiently fulfilled when the toner is heated in removal from the image holding member. Accordingly, when the toner is separated from the image holding member, no toner layer is interrupted midway so that no unremoved toner is left on the image holding member. Further, no image holding member is damaged by separating a portion of fibers from the image holding member surface through the toner.

Many widely different embodiments of the present invention may be constructed without departing from the spirit and scope of the present invention. It should be understood that the present invention is not limited to the specific embodiments described in the specification, except as defined in the appended claims.

What is claimed is:

1. A device for regenerating an image holding member having an image formed on a surface of the image forming member by fixing thermally softened toner having thermally melted resin as a principal component onto the surface using heat in a heating temperature range, the thermally softened toner having a maximum value of viscosity in the heating temperature range of tan δ which is in a range from 1.8 to 2.1, and the toner beginning to flow at a temperature which is equal to or higher than 151° C., comprising:

a liquid supplying means for impregnating the image holding member with a liquid which does not dissolve the toner constituting the image;

attaching means for attaching the toner on the image holding member to a toner separating means having an adhesive force stronger than that between the toner and the surface of the image holding member; and removing means for removing the toner from the image holding member by separating the toner from the surface of the image holding member.

2. A device for generating an image holding member as claimed in claim 1, wherein said liquid is selected from the group consisting of water, an aqueous solution including a surfactant, an aqueous solution including a water-soluble polymer, an aqueous solution including a surfactant and a water-soluble polymer.

3. A device for regenerating an image holding member as claimed in claim 1, wherein said attaching means includes heating means for heating the toner on the image holding member.

4. A device for regenerating an image holding member as claimed in claim 2, wherein said attaching means includes heating means for heating the toner on the image holding member.

5. A device for regenerating an image holding member having an image formed on a surface of the image forming member by fixing thermally softened toner having thermally melted resin as a principal component onto the surface using heat in a heating temperature range, thermally softened toner having a maximum value of viscosity in the heating temperature range of tan δ which is in a range from 1.8 to 2.1, and the toner beginning to flow at a temperature which is equal to or higher than 151° C., comprising:

a coating roller contacting a liquid, the liquid not dissolving the toner constituting the image, and supplying the liquid to impregnate the image holding member;

a toner separating belt having an adhesive force stronger than that between the toner and the surface of the image holding member to contact the image holding member impregnated with the liquid to attach to the toner, and to remove the toner from the image holding member by separating the toner from the surface of the image holding member.

6. A device for regenerating an image holding member as claimed in claim 5, wherein said liquid is selected from the group consisting of water, an aqueous solution including a surfactant, an aqueous solution including a water-soluble polymer, an aqueous solution including a surfactant and a water-soluble polymer.

7. A device for generating an image holding member as claimed in claim 5, further comprising a heater heating the toner on the image holding member.

8. A device for regenerating an image holding member as claimed in claim 6, further comprising a heater heating the toner on the image holding member.

* * * * *